US012734657B2

(12) United States Patent
Vollmer

(10) Patent No.: US 12,734,657 B2
(45) Date of Patent: Sep. 15, 2026

(54) BLIND RIVET NUT-SETTING TOOL

(71) Applicant: MILWAUKEE ELECTRIC TOOL CORPORATION, Brookfield, WI (US)

(72) Inventor: Blaine Vollmer, Plover, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/982,795

(22) Filed: Dec. 16, 2024

(65) Prior Publication Data

US 2025/0114925 A1 Apr. 10, 2025

Related U.S. Application Data

(60) Division of application No. 18/142,782, filed on May 3, 2023, now Pat. No. 12,194,603, which is a (Continued)

(51) Int. Cl.
*B25B 27/00* (2006.01)
*B21J 15/10* (2006.01)
(Continued)

(52) U.S. Cl.
CPC ......... *B25B 27/0014* (2013.01); *B21J 15/105* (2013.01); *B21J 15/26* (2013.01); *F16B 37/067* (2013.01); *Y10T 29/5377* (2015.01)

(58) Field of Classification Search
CPC ..... B25B 27/0014; B21J 15/105; B21J 15/26; F16B 37/067; Y10T 29/5377
See application file for complete search history.

(56) References Cited

U.S. PATENT DOCUMENTS 2,423,956 A 7/1947 Amtsberg
2,723,777 A 11/1955 Amtsberg
(Continued)

FOREIGN PATENT DOCUMENTS

CN 2133383 Y 5/1993
CN 2262472 Y 9/1997
(Continued)

OTHER PUBLICATIONS

European Patent Office Extended Search Report for Application No. 19195370.2 dated Jun. 3, 2020 (8 pages).
(Continued)

*Primary Examiner* — Bayan Salone
(74) *Attorney, Agent, or Firm* — Michael Best & Friedrich LLP

(57) ABSTRACT

A method of operating a blind rivet nut-setting tool includes pressing a blind rivet nut on an output shaft of the tool against a workpiece, thereby applying an external force to the output shaft to move the output shaft in a rearward direction along a longitudinal axis from a first position to a second position, activating a first motor to rotate the output shaft about the longitudinal axis in response to the output shaft activating a limit switch after reaching the second position, thereby rotating the output shaft relative to the blind rivet nut causing plastic deformation of the blind rivet nut, and activating a second motor to translate the output shaft along the longitudinal axis in the rearward direction, causing further plastic deformation of the blind rivet nut and permanently setting the blind rivet nut on the workpiece.

21 Claims, 6 Drawing Sheets

Related U.S. Application Data continuation of application No. 16/558,715, filed on Sep. 3, 2019, now Pat. No. 11,673,243.

(60) Provisional application No. 62/727,160, filed on Sep. 5, 2018.

(51) Int. Cl.
*B21J 15/26* (2006.01)
*F16B 37/06* (2006.01)

(56) References Cited

U.S. PATENT DOCUMENTS 2,753,072 A 7/1956 Mitchell
2,941,687 A 6/1960 Simmons
3,055,255 A 9/1962 Burrell
3,107,806 A 10/1963 Van Hecke et al.
3,120,845 A 2/1964 Horner
3,406,556 A 10/1968 Musser
3,548,627 A 12/1970 Henshaw
3,574,915 A 4/1971 Jeal
3,605,478 A 9/1971 Chirco
3,686,915 A 8/1972 Miller et al.
3,933,019 A 1/1976 Underland et al.
4,063,443 A 12/1977 Yarbrough
4,074,554 A 2/1978 Summerlin
4,140,000 A 2/1979 Ehmann
4,321,814 A 3/1982 Martin
4,368,631 A 1/1983 Tanikawa
4,425,782 A 1/1984 Todisco
4,559,806 A 12/1985 Schwab
4,571,976 A 2/1986 Schwab
4,574,612 A 3/1986 Tanikawa
4,612,793 A 9/1986 Klein
4,653,308 A 3/1987 Gregory
4,770,023 A 9/1988 Schwab
4,796,455 A 1/1989 Rosier
4,821,555 A 4/1989 Kamata et al.
4,864,839 A 9/1989 Schwab
4,896,522 A 1/1990 Rosier
4,979,279 A 12/1990 Garvey
5,042,131 A 8/1991 Low
5,050,420 A 9/1991 Liu
5,189,780 A 3/1993 Landes
5,208,959 A 5/1993 Rosier et al.
5,219,375 A 6/1993 Kamata et al.
5,259,713 A 11/1993 Renner et al.
5,323,946 A 6/1994 O'Connor et al.
5,361,473 A 11/1994 Landes
5,403,135 A 4/1995 Renner et al.
5,473,805 A 12/1995 Wille
5,579,641 A 12/1996 Wilcox
5,605,070 A 2/1997 Wille
5,647,209 A 7/1997 Wilcox
5,729,880 A 3/1998 Ko
6,021,553 A 2/2000 Bieber et al.
6,145,360 A 11/2000 Honsel et al.
6,212,931 B1 * 4/2001 Solfronk ............. B25B 27/0014 29/243.526
6,276,050 B1 8/2001 Mauer et al.
6,374,474 B1 4/2002 Rössler
6,425,170 B1 7/2002 Zirps et al.
6,449,822 B1 9/2002 Gilbert et al.
6,502,008 B2 12/2002 Maurer et al.
6,622,363 B2 9/2003 Komsta
6,684,470 B1 * 2/2004 Joux ...................... B21J 15/105 29/243.526
6,732,563 B1 * 5/2004 Chen .................. B25B 27/0014 72/391.8
6,840,075 B2 1/2005 Neri et al.
6,886,226 B1 5/2005 Dear et al.
6,904,831 B2 6/2005 Aasgaard
7,024,270 B2 4/2006 Mauer et al.
7,032,296 B2 4/2006 Zdravkovic et al.
7,101,300 B2 9/2006 Milbourne et al.
7,123,982 B2 * 10/2006 Mauer .................... B21J 15/285 700/174
7,146,715 B2 12/2006 Villanueva
7,200,914 B2 4/2007 Kaddatz
7,228,607 B1 6/2007 Liu
7,314,097 B2 1/2008 Jenner et al.
7,322,783 B2 1/2008 Pearce et al.
7,331,205 B2 * 2/2008 Chitty ...................... B21J 15/28 72/21.4
7,346,970 B2 3/2008 Stoger
7,346,971 B2 * 3/2008 Chitty .................... B21J 15/105 72/21.1
7,409,760 B2 8/2008 Mauer et al.
7,452,304 B2 11/2008 Hagan et al.
7,458,245 B1 12/2008 Wilcox
7,464,454 B2 12/2008 Aasgaard
7,503,196 B2 * 3/2009 Chitty ...................... B21J 15/10 72/21.4
7,559,133 B2 7/2009 Chitty et al.
7,631,534 B2 12/2009 Wilcox
7,647,680 B2 1/2010 Dear
7,752,739 B2 7/2010 Mauer et al.
7,818,859 B2 10/2010 Pearce et al.
7,900,714 B2 3/2011 Milbourne et al.
8,146,240 B2 4/2012 Mauer et al.
8,220,561 B2 7/2012 Milbourne et al.
8,251,158 B2 8/2012 Tomayko et al.
8,434,564 B2 5/2013 Tomayko et al.
8,443,512 B2 5/2013 Masugata
8,468,669 B1 6/2013 Lin et al.
8,561,275 B2 10/2013 Wille
8,631,554 B2 1/2014 Wille
8,640,315 B1 2/2014 Nikkel
8,776,338 B2 7/2014 Yuan
9,003,621 B2 4/2015 Ko
9,015,920 B2 4/2015 Mauer et al.
9,027,220 B2 5/2015 Schlafhauser
9,079,240 B2 7/2015 Schiffler et al.
9,227,313 B2 1/2016 Tseng
9,682,419 B2 6/2017 Schmidt
9,724,751 B2 8/2017 Stahl
9,833,832 B2 12/2017 Weyland et al.
9,849,502 B2 12/2017 Gaertner et al.
9,878,434 B2 1/2018 Hecht et al.
RE46,857 E 5/2018 Matsugata
9,968,988 B2 * 5/2018 Masugata ................ B21J 15/26
10,040,182 B2 8/2018 Kirilichin et al.
10,058,910 B2 * 8/2018 Weyland .................. B21J 15/30
10,112,232 B2 * 10/2018 Honsel ..................... B21J 15/26
10,232,429 B1 3/2019 Lin et al.
10,270,316 B2 4/2019 Niwa
10,307,872 B2 6/2019 Simonet
10,483,901 B2 11/2019 Woyciesjes et al.
10,549,445 B2 2/2020 Myrhum, Jr. et al.
10,570,946 B2 2/2020 Linsel
10,771,004 B2 9/2020 Woyciesjes et al.
10,850,380 B2 12/2020 Huber et al.
10,859,105 B2 12/2020 Turechek et al.
2001/0003859 A1 6/2001 Mauer et al.
2004/0247412 A1 12/2004 Reck et al.
2006/0048956 A1 3/2006 Hofbrucker et al.
2008/0038085 A1 2/2008 Aasgaard
2008/0210060 A1 9/2008 Aasgaard
2010/0275424 A1 11/2010 Masugata
2010/0295696 A1 11/2010 Chu et al.
2011/0271504 A1 * 11/2011 Preti ........................ B21J 15/26 29/243.524
2012/0030918 A1 2/2012 Desalvo et al.
2012/0111592 A1 5/2012 Limberg et al.
2012/0318547 A1 12/2012 Milbourne et al.
2013/0125360 A1 5/2013 Boivin et al.
2013/0161040 A1 6/2013 Tomayko et al.
2013/0205577 A1 8/2013 Soller
2013/0213680 A1 8/2013 Chen
2013/0263433 A1 10/2013 Stoian
2015/0251239 A1 9/2015 Gaertner et al.
2016/0114383 A1 4/2016 Honsel
2016/0151828 A1 6/2016 Weyland
2017/0320127 A1 11/2017 Tripp et al.

(56) References Cited

U.S. PATENT DOCUMENTS

| | | | |
|---|---|---|---|
| 2018/0003210 | A1 | 1/2018 | Linsel |
| 2018/0126446 | A1 | 5/2018 | Mori |
| 2018/0318992 | A1 | 11/2018 | Kirilichin et al. |
| 2019/0240819 | A1 | 8/2019 | Macchieraldo |
| 2019/0283110 | A1 | 9/2019 | Kawai et al. |
| 2019/0283111 | A1 | 9/2019 | Kawai et al. |
| 2019/0283112 | A1 | 9/2019 | Ikuta et al. |
| 2019/0283222 | A1 | 9/2019 | Thorson et al. |
| 2019/0314888 | A1 | 10/2019 | Ikuta et al. |
| 2019/0351477 | A1 | 11/2019 | Yabuguchi et al. |
| 2019/0375079 | A1 | 12/2019 | Kamiya |
| 2020/0070327 | A1 | 3/2020 | Vollmer |
| 2020/0122224 | A1 | 4/2020 | Wu |
| 2020/0130047 | A1 | 4/2020 | Yabunaka et al. |
| 2020/0139424 | A1 | 5/2020 | Yabuguchi et al. |
| 2020/0158157 | A1 | 5/2020 | Linsel |
| 2020/0198167 | A1 | 6/2020 | Myrhum, Jr. et al. |
| 2020/0238489 | A1 | 7/2020 | Mori |
| 2021/0039234 | A1 | 2/2021 | Kirilichin et al. |
| 2021/0069773 | A1 | 3/2021 | Yabunaka et al. |

FOREIGN PATENT DOCUMENTS

| | | | | | |
|---|---|---|---|---|---|
| CN | 102294426 | A | | 12/2011 | |
| CN | 202726814 | U | | 2/2013 | |
| CN | 203031537 | U | | 7/2013 | |
| CN | 203184566 | U | | 9/2013 | |
| CN | 203830638 | U | | 9/2014 | |
| CN | 104148571 | A | | 11/2014 | |
| CN | 204018628 | U | | 12/2014 | |
| CN | 204094710 | U | | 1/2015 | |
| CN | 204183494 | U | | 3/2015 | |
| CN | 104550615 | A | | 4/2015 | |
| CN | 104550616 | A | | 4/2015 | |
| CN | 104550619 | A | | 4/2015 | |
| CN | 204565044 | U | | 8/2015 | |
| CN | 205324607 | U | | 6/2016 | |
| CN | 104999410 | B | | 3/2017 | |
| CN | 206028637 | U | | 3/2017 | |
| CN | 106670373 | A | | 5/2017 | |
| CN | 106799451 | A | | 6/2017 | |
| CN | 107559286 | A | | 1/2018 | |
| CN | 207563672 | U | | 7/2018 | |
| CN | 109909430 | A | | 6/2019 | |
| CN | 210576957 | U | | 5/2020 | |
| CN | 105589414 | B | | 1/2021 | |
| DE | 7206720 | U | | 11/1972 | |
| DE | 2320080 | C3 | | 8/1981 | |
| DE | 2417646 | C2 | | 4/1985 | |
| DE | 3432376 | A1 | | 3/1986 | |
| DE | 3306827 | C2 | | 5/1986 | |
| DE | 3532932 | A1 | | 3/1987 | |
| DE | 3603421 | A1 | | 8/1987 | |
| DE | 3308915 | C2 | | 9/1987 | |
| DE | 4100709 | A1 | | 7/1992 | |
| DE | 9207634 | U1 | | 8/1992 | |
| DE | 9300118 | U1 | | 2/1993 | |
| DE | 9406626 | U1 | | 6/1994 | |
| DE | 4406946 | A1 | | 9/1995 | |
| DE | 3400942 | C2 | | 11/1995 | |
| DE | 29502918 | U1 | | 6/1996 | |
| DE | 19502855 | C2 | | 11/1997 | |
| DE | 29902826 | U1 | | 6/1999 | |
| DE | 3701883 | C2 | | 9/1999 | |
| DE | 19809354 | A1 | | 9/1999 | |
| DE | 19819251 | A1 | | 11/1999 | |
| DE | 29900048 | U1 | | 6/2000 | |
| DE | 19902858 | A1 | | 7/2000 | |
| DE | 20013585 | U1 | | 12/2000 | |
| DE | 29914202 | U1 | | 12/2000 | |
| DE | 10130681 | A1 | | 1/2003 | |
| DE | 20023264 | U1 | | 7/2003 | |
| DE | 10325851 | A1 | | 12/2004 | |
| DE | 102005022748 | A1 | | 11/2006 | |
| DE | 102005053221 | A1 | | 5/2007 | |
| DE | 102005054048 | A1 | | 5/2007 | |
| DE | 10342143 | B4 | | 7/2007 | |
| DE | 202008003684 | U1 | | 7/2008 | |
| DE | 102008013044 | B3 | | 7/2009 | |
| DE | 102010024610 | A1 | | 12/2010 | |
| DE | 202011005601 | U1 | | 7/2011 | |
| DE | 102010022022 | A1 | | 12/2011 | |
| DE | 102010035613 | A1 | | 3/2012 | |
| DE | 102012216838 | A1 | | 6/2014 | |
| DE | 102013008653 | A1 | | 11/2014 | |
| DE | 102013208288 | A1 | | 11/2014 | |
| DE | 102014207340 | A1 | | 11/2014 | |
| DE | 102013105703 | A1 | | 12/2014 | |
| DE | 102013221789 | A1 | | 4/2015 | |
| DE | 102013221790 | A1 | | 5/2015 | |
| DE | 102014223034 | A1 | | 5/2016 | |
| DE | 102014117401 | A1 | | 6/2016 | |
| DE | 102015103277 | A1 | | 9/2016 | |
| DE | 102015116559 | A1 | | 3/2017 | |
| DE | 102015216360 | A1 | | 3/2017 | |
| DE | 102015119571 | A1 | | 5/2017 | |
| DE | 102015221476 | A1 | | 5/2017 | |
| DE | 102016209749 | A1 | | 12/2017 | |
| DE | 102017209844 | A1 | | 1/2018 | |
| DE | 102017219712 | A1 | | 5/2019 | |
| DE | 102017223713 | A1 | | 6/2019 | |
| DE | 102018207443 | A1 | | 11/2019 | |
| DE | 202020101120 | U1 | | 3/2020 | |
| DE | 102019107380 | A1 | | 9/2020 | |
| EP | 0043216 | A1 | | 1/1982 | |
| EP | 0043217 | A1 | | 1/1982 | |
| EP | 0081345 | A1 | | 6/1983 | |
| EP | 0119007 | A2 | | 9/1984 | |
| EP | 0120309 | A2 | | 10/1984 | |
| EP | 0027663 | B1 | | 2/1985 | |
| EP | 0302136 | A1 | | 2/1989 | |
| EP | 0325669 | A1 | | 8/1989 | |
| EP | 0259405 | B1 | | 1/1991 | |
| EP | 0456852 | A1 | | 11/1991 | |
| EP | 0494747 | A1 | | 7/1992 | |
| EP | 0236464 | B1 | | 12/1992 | |
| EP | 0670199 | A1 | | 9/1995 | |
| EP | 0807007 | B1 | | 12/1999 | |
| EP | 1018407 | A2 | | 7/2000 | |
| EP | 1503089 | A1 | | 2/2005 | |
| EP | 0927585 | B1 | | 4/2006 | |
| EP | 1258321 | B1 | | 7/2007 | |
| EP | 1707848 | B1 | | 8/2008 | |
| EP | 2093024 | A1 | * | 8/2009 | ......... B25B 27/0014 |
| EP | 1089839 | B1 | | 12/2009 | |
| EP | 2390059 | A2 | | 11/2011 | |
| EP | 2399712 | A2 | | 12/2011 | |
| EP | 2402095 | A1 | | 1/2012 | |
| EP | 2786843 | A2 | | 10/2014 | |
| EP | 2827006 | A1 | | 1/2015 | |
| EP | 2409814 | B1 | | 3/2015 | |
| EP | 2910321 | A1 | | 8/2015 | |
| EP | 2918357 | A1 | | 9/2015 | |
| EP | 2626154 | B1 | | 12/2015 | |
| EP | 2985094 | A1 | | 2/2016 | |
| EP | 2862676 | B1 | | 6/2016 | |
| EP | 3025807 | A1 | | 6/2016 | |
| EP | 2608909 | B1 | | 11/2016 | |
| EP | 3159112 | A2 | | 4/2017 | |
| EP | 3167973 | A1 | | 5/2017 | |
| EP | 3263921 | A1 | | 1/2018 | |
| EP | 3067157 | B1 | | 4/2018 | |
| EP | 3342506 | A1 | | 7/2018 | |
| EP | 3181260 | B1 | | 9/2019 | |
| GB | 1457326 | A | | 12/1976 | |
| JP | 2000190246 | A | | 7/2000 | |
| JP | 2018144953 | A | * | 9/2018 | |
| JP | 6805895 | B2 | * | 12/2020 | |
| WO | WO8704647 | A1 | | 8/1987 | |
| WO | WO9965630 | A1 | | 12/1999 | |
| WO | WO0236282 | A1 | | 5/2002 | |
| WO | WO0243898 | A2 | | 6/2002 | |
| WO | WO2009072836 | A2 | | 6/2009 | |
| WO | WO 2012025102 | A2 | | 3/2012 | |

(56) References Cited

FOREIGN PATENT DOCUMENTS

| | | | |
|---|---|---|---|
| WO | WO2013180769 | A1 | 12/2013 |
| WO | WO 2014195189 | A1 | 12/2014 |
| WO | WO2016050121 | A1 | 4/2016 |
| WO | WO2016086844 | A1 | 6/2016 |
| WO | WO2018139372 | A1 | 8/2018 |
| WO | WO2019049910 | A1 | 3/2019 |
| WO | WO2019054257 | A1 | 3/2019 |
| WO | WO2020016288 | A1 | 1/2020 |
| WO | WO2020233914 | A1 | 11/2020 |
| WO | WO2020245310 | A1 | 12/2020 |
| WO | WO2021017548 | A1 | 2/2021 |

OTHER PUBLICATIONS

International Search Report and Written Opinion for Application No. PCT/US2022/038687 dated Nov. 23, 2022 (13 pages).

* cited by examiner 58
22
18,72
66
20
164
166
170
162
178

58
22
18,72
66
20
164
166
170
162
F
178

BLIND RIVET NUT-SETTING TOOL

CROSS-REFERENCE TO RELATED APPLICATIONS

This application is a divisional of U.S. patent application Ser. No. 18/142,782, filed on May 3, 2023, now U.S. Pat. No. 12,194,603, which is a continuation of U.S. patent application Ser. No. 16/558,715, filed on Sep. 3, 2019, now U.S. Pat. No. 11,673,243, which claims priority to U.S. Provisional Patent Application No. 62/727,160, filed on Sep. 5, 2018, the entire contents of all of which are incorporated herein by reference.

FIELD OF THE INVENTION

The present invention relates to blind rivet nut-setting tools, and more particularly to powered blind rivet nut-setting tools.

BACKGROUND OF THE INVENTION

Powered blind rivet nut-setting tools rotate an output shaft to thread the output shaft into a blind rivet nut. After the output shaft is threaded into the blind rivet nut, the output shaft performs a setting stroke to set the blind rivet nut on a workpiece.

SUMMARY OF THE INVENTION

The present disclosure provides, in one aspect, a method of operating a blind rivet nut-setting tool, the method including: pressing a blind rivet nut on an output shaft of the tool against a workpiece, thereby applying an external force to the output shaft to move the output shaft in a rearward direction along a longitudinal axis from a first position to a second position; activating a first motor to rotate the output shaft about the longitudinal axis in response to the output shaft activating a limit switch after reaching the second position, thereby rotating the output shaft relative to the blind rivet nut causing plastic deformation of the blind rivet nut; and activating a second motor to translate the output shaft along the longitudinal axis in the rearward direction, causing further plastic deformation of the blind rivet nut and permanently setting the blind rivet nut on the workpiece.

The present disclosure provides, in another aspect, a method of operating a blind rivet nut-setting tool, the method including: activating a first motor automatically in response to pressing a blind rivet nut coupled to an output shaft of the tool against a workpiece, thereby displacing the output shaft along a longitudinal axis from a first position, in which a limit switch is not engaged, to a second position, in which the limit switch is engaged, causing the first motor and the output shaft to rotate about the longitudinal axis relative to the blind rivet nut; depressing a trigger to activate a second motor, causing the second motor and a cam member to rotate about a rotational axis and displace the output shaft along the longitudinal axis to a third position where the blind rivet nut becomes plastically deformed and permanently set on the workpiece; and depressing a reverse trigger to activate the first motor and rotate the output shaft in an unthreading direction to unthread the blind rivet nut from the output shaft.

The present disclosure provides, in another aspect, a method of operating a blind rivet nut-setting tool, the method including: engaging a blind rivet nut with an output shaft of the tool with a sufficient force, causing the output shaft to move the output shaft in a rearward direction along a longitudinal axis from a first position to a second position; activating a first motor to rotate the output shaft about the longitudinal axis in response to the output shaft reaching the second position, thereby coupling the blind rivet nut onto the output shaft and translating the output shaft toward the first position; deactivating the first motor in response to the output shaft returning to the first position, at which point the blind rivet nut is engaged with a nosepiece of the tool; and activating a second motor to translate the output shaft along the longitudinal axis toward a third position that is rearward of the first position, thereby crushing the blind rivet nut against the nosepiece.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
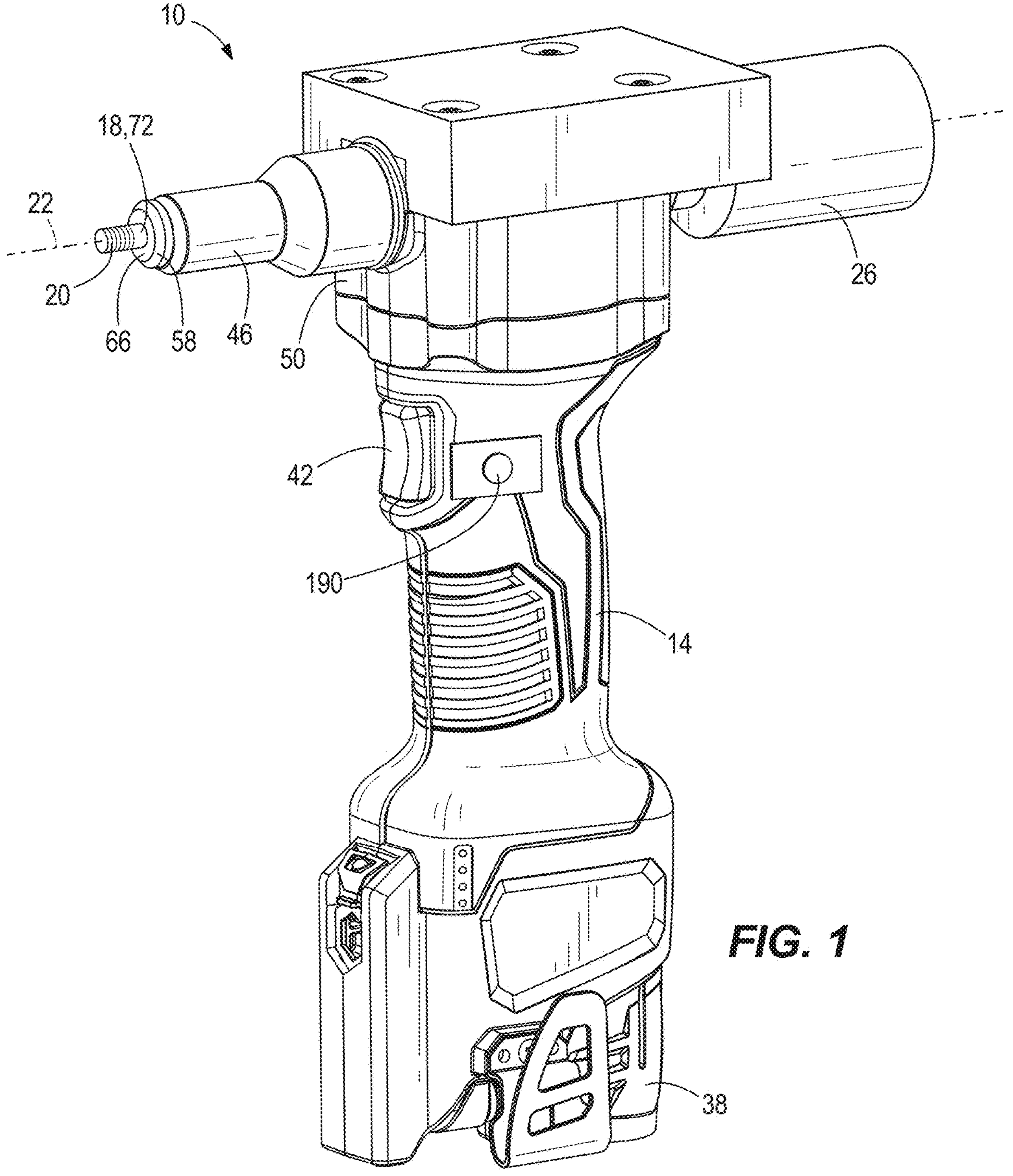
FIG. 1 is a perspective view of a blind rivet nut-setting tool.
Figure 2:
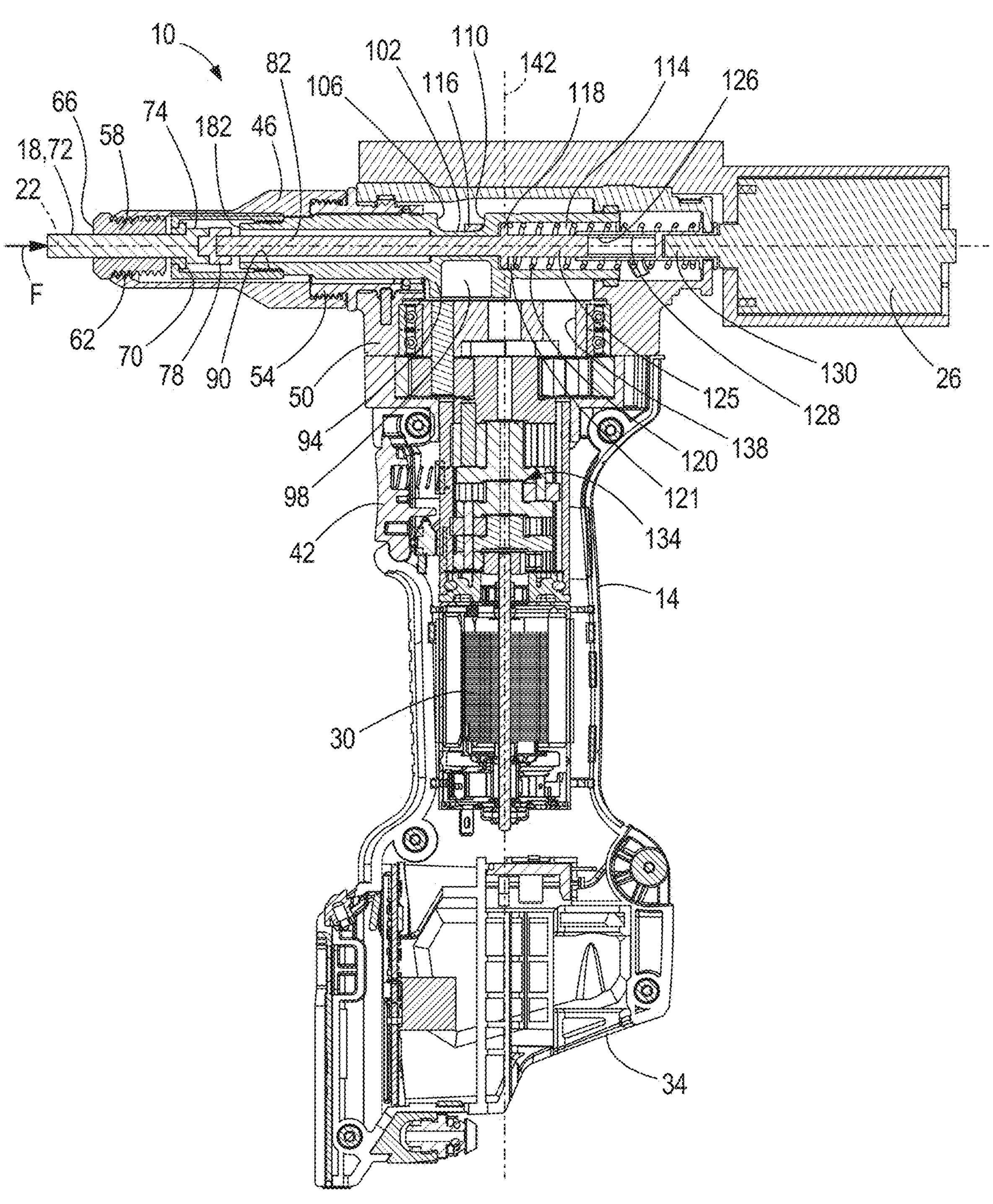
FIG. 2 is a cross-sectional view of the blind rivet nut-setting tool of FIG. 1.

As shown in FIGS. 1 and 2, a blind rivet nut-setting tool 10 includes a housing 14, an output shaft 18 having threads 20 and defining a longitudinal axis 22, a first motor 26 for rotating the output shaft 18 about the longitudinal axis 22, and a second motor 30 for translating the output shaft 18 along the longitudinal axis 22. The housing 14 includes a battery receptacle 34 (FIG. 2) for receiving a battery 38 (FIG. 1) to power the first and second motors 26, 30 and a trigger 42 for activating the second motor 30 to initiate a setting stroke, as explained in further detail below.

With reference to FIG. 2, the housing 14 includes a front piece 46 that is threaded onto a main body 50 of the housing 14 via threads 54. A nosepiece 58 is threaded into the front piece 46 via threads 62. The output shaft 18 extends through the nosepiece 58 and into a tube 70. The output shaft 18 is a multi-piece output shaft including a working end 72 having the threads 20 and a shoulder 74 within the tube 70, a first piece 78 within the tube 70, and a second piece 82 that extends into the tube 70 and through a carrier 86 that is arranged along the longitudinal axis 22. In alternative embodiments, the output shaft 18 is integrally formed along its entire length. The tube 70 is threaded to the carrier 86 via threads 90.

Figures 3, 4:
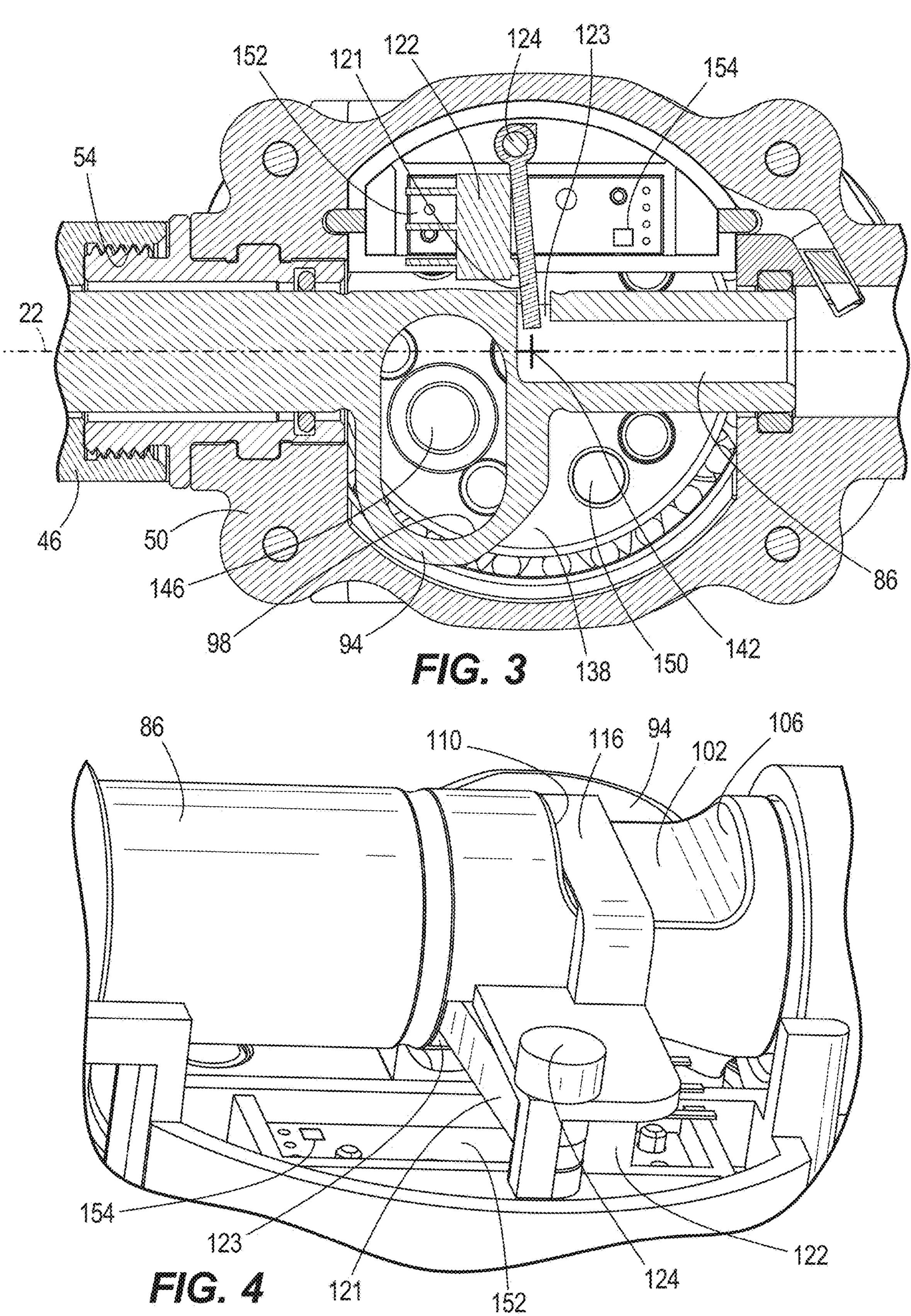
FIG. 3 is an enlarged cross-sectional view of the blind rivet nut-setting tool of FIG. 1.
FIG. 4 is an enlarged perspective view of the blind rivet nut-setting tool of FIG. 1, with portions removed.

With reference to FIGS. 2 and 3, the carrier 86 includes a lobe 94 with a recess 98, a groove 102 defined by first and second shoulders 106, 110 and a bore 114. A bracket 116 is arranged in the groove 102. The second piece 82 of the output shaft 18 includes a flange 118 arranged in the bore 114. The flange 118 is biased by a compression spring 120 towards the carrier 86, such that the carrier 86 is biased toward the nosepiece 58. As shown in FIGS. 2-4, an actuating arm 121 of a limit switch 122 extends through a groove 123 in the carrier 86 into the bore 114 of the carrier 86, and is arranged on a side of the flange 118 of the second piece 82 opposite the bracket 116. The bracket 116 supports the limit switch 122, and the actuating arm 121 is pivotably coupled to the bracket 116 via a pivot 124 (e.g., a fastener), allowing the actuating arm 121 to pivot between a neutral position, in which the limit switch is not actuated, and an actuating position, in which the limit switch 122 is actuated.

An end 125 of the second piece 82 of the output shaft 18 extends into a recess 126 of a drive shaft 128, which is coupled for rotation with an output shaft 130 of the first motor 26. The recess 126 of the drive shaft 128 has a non-circular cross-sectional shape, and the end 125 of the second piece 82 of the output shaft 18 has a corresponding non-circular cross-sectional shape, such that the second piece 82 of the output shaft 18 is coupled for co-rotation with the drive shaft 128. In alternative embodiments, the end 125 of the second piece 82 of the output shaft 18 has a spline fit within the recess 126 of the drive shaft 128.

When the tool 10 is not operating, the compression spring 120, via the flange 118 of the second piece 82, biases the output shaft 18 to a neutral, first output shaft position shown in FIG. 2. Likewise, the carrier 86 is biased by the compression spring 120, via the flange 118 of the second piece 82, to a neutral first carrier position, also shown in FIG. 2. When the carrier 86 is in the first carrier position, the second shoulder 110 abuts against the bracket 116.

With reference to FIGS. 2 and 3, the second motor 30 transmits torque through a multi-stage planetary transmission 134 terminating in a cam member 138 that defines a rotational axis 142 that intersects and is perpendicular to the longitudinal axis 22. The cam member 138 includes a pin 146 that is eccentrically arranged on the cam member 138 and extends into the recess 98 of the lobe 94 of the carrier 86. With reference to FIG. 3, the cam member 138 includes a magnet 150, and a printed circuit board (PCB) 152 in the main body 50 of the housing 14 includes a sensor 154, such as a Hall-effect sensor, that is configured to detect the proximity of the magnet 150 as the cam member 138 rotates relative to the PCB 152. In other embodiments, the magnet 150 can be located on the carrier 86, such that the sensor 154 can detect proximity of the magnet as the carrier 86 translates relative to the PCB 152.

Figures 5, 6:
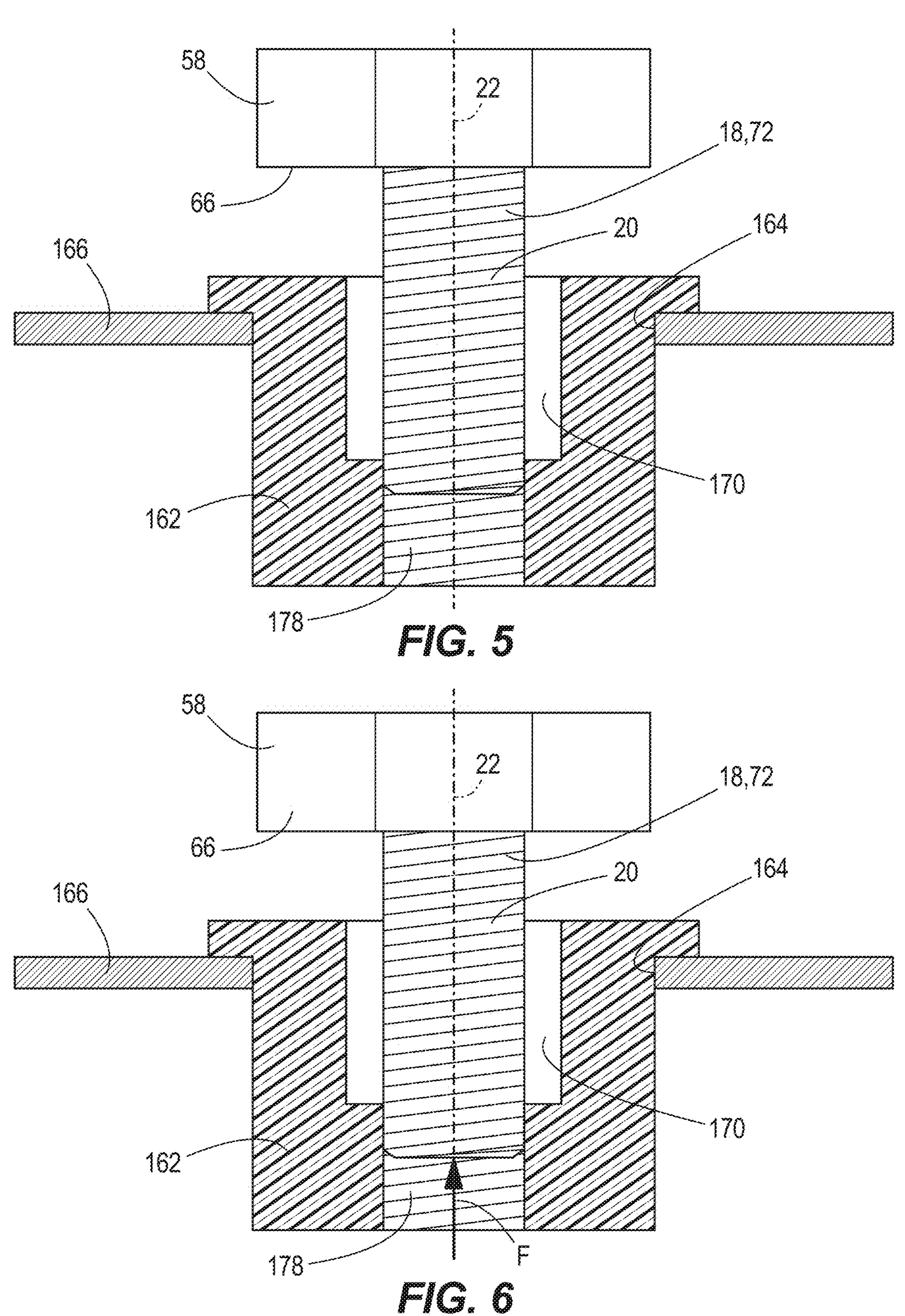
FIG. 5 is a cross-sectional view of an output shaft of the blind rivet nut-setting tool of FIG. 1 with a blind rivet nut partially threaded onto the output shaft, and the blind rivet nut inserted through an aperture in a workpiece.
FIG. 6 is a cross-sectional view of the output shaft of the blind rivet nut-setting tool of FIG. 1 translated in a rearward direction to initiate a threading action of the output shaft into the blind rivet nut.

In operation, an operator uses the tool 10 to set a blind rivet nut 162 into an aperture 164 in a workpiece 166, as shown in FIG. 5. First, the operator manually threads the blind rivet nut 162 partially onto the working end 72 of the output shaft 18. Specifically, the operator places the working end 72 of the output shaft 18 into an unthreaded bore 170 of the blind rivet nut 162, and then manually partially threads a threaded bore 178 of the blind rivet nut 162 onto the threads 20 of the working end 72 as shown in FIG. 5.

The operator then inserts the blind rivet nut 162 into the opening 164 in the workpiece 166 and pushes the tool 10 toward the workpiece 166. As shown in FIG. 6, this results in a normal force F being applied to the output shaft 18 in a rearward direction toward the first motor 26, causing the output shaft 18 to translate in the rearward direction along the longitudinal axis 22, relative to the nosepiece 58 and carrier 86. Rearward translation of the output shaft 18 also pivots the actuating arm 121 (via the interaction between the flange 118 and the arm 121) away from the switch 122, from the neutral position to the actuating position. In the actuating position, the arm 121 actuates the limit switch 122, coinciding with the output shaft 18 reaching the second output shaft position.

Figure 7:
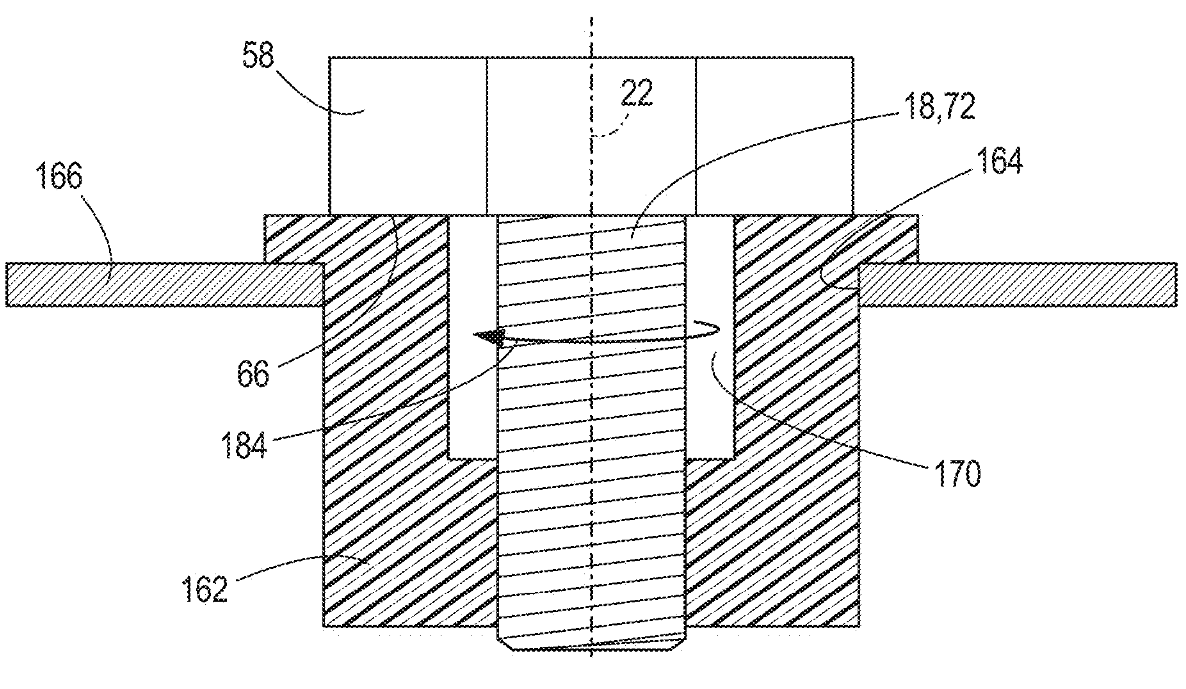
FIG. 7 is a cross-sectional view of the output shaft of the blind rivet nut-setting tool of FIG. 1 being threaded into the blind rivet nut.
Figure 8:
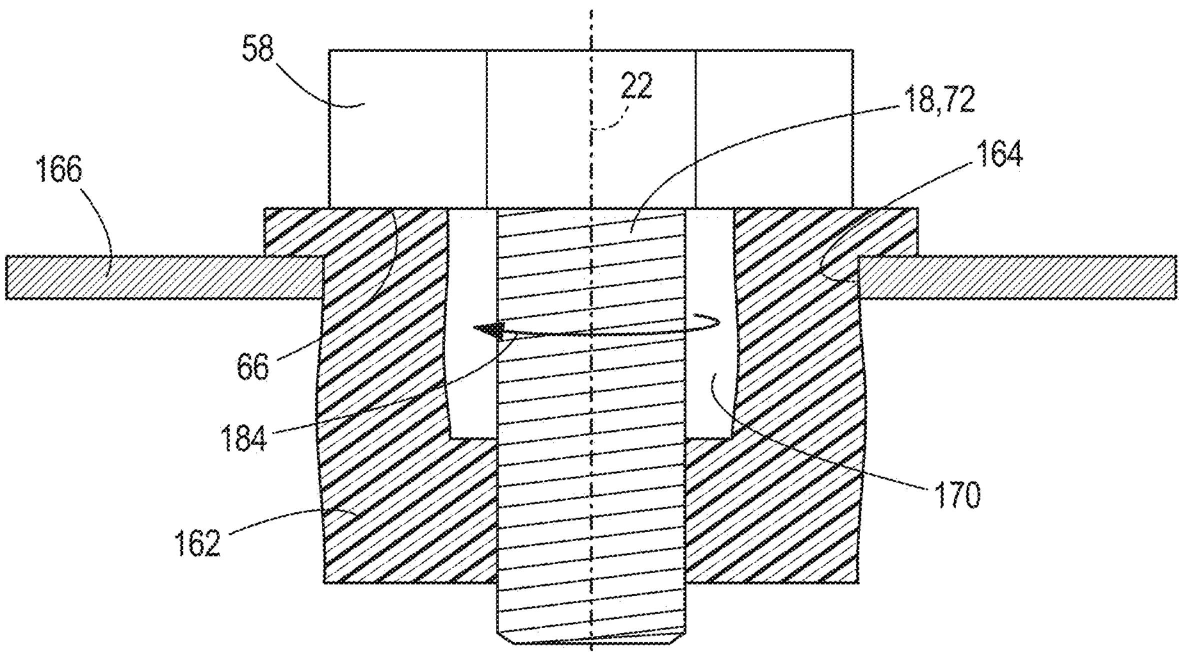
FIG. 8 is a cross-sectional view of the output shaft of the blind rivet nut-setting tool of FIG. 1 being further threaded into the blind rivet nut after the blind rivet nut has reached a nosepiece of the blind rivet nut-setting tool.

In response to the limit switch 122 being actuated when the output shaft 18 has reached the second output shaft position, the first motor 26 rotates the output shaft 130 in a threading direction, which causes corresponding rotation of the drive shaft 128 and the output shaft 18, thus beginning a threading action into the blind rivet nut 162. Specifically, as the operator continues to push the working end 72 of the output shaft 18 toward the blind rivet nut 162, the output shaft 18 rotates in a threading direction 184 (FIG. 7), causing the working end 72 of the output shaft 18 to be threaded into the threaded bore 178 of the blind rivet nut 162. As the output shaft 18 threads into the threaded bore 178, the blind rivet nut 162 translates along the output shaft 18 until it abuts against the end 66 of the nosepiece 58 as shown in FIG. 7. However, the output shaft 18 continues rotating in the first direction 184 as shown in FIG. 8, thereby continuing to thread its way through the threaded bore 178 of the blind rivet nut 162. Thus, the output shaft 18 rotates about and translates along the longitudinal axis 22 away from the second output shaft position and towards the first output shaft position until the actuating arm 121 has returned to its neutral position in which the limit switch 122 is de-actuated. Once the limit switch 122 is de-actuated, the first motor 26 is deactivated, thereby ceasing rotation of the output shaft 18, which is now fully threaded into the blind rivet nut 162.

After the blind rivet nut 162 is fully threaded onto the output shaft 18, the operator may initiate a setting stroke by pulling the trigger 42 to activate the second motor 30. The second motor 30 rotates the cam member 138 counterclockwise as viewed in FIG. 3 about the rotation axis 142 via the transmission 134, causing the pin 146 to move within the recess 98 of the lobe 94 and thereby pull the lobe 94 away from the front piece 46.

Figure 9:
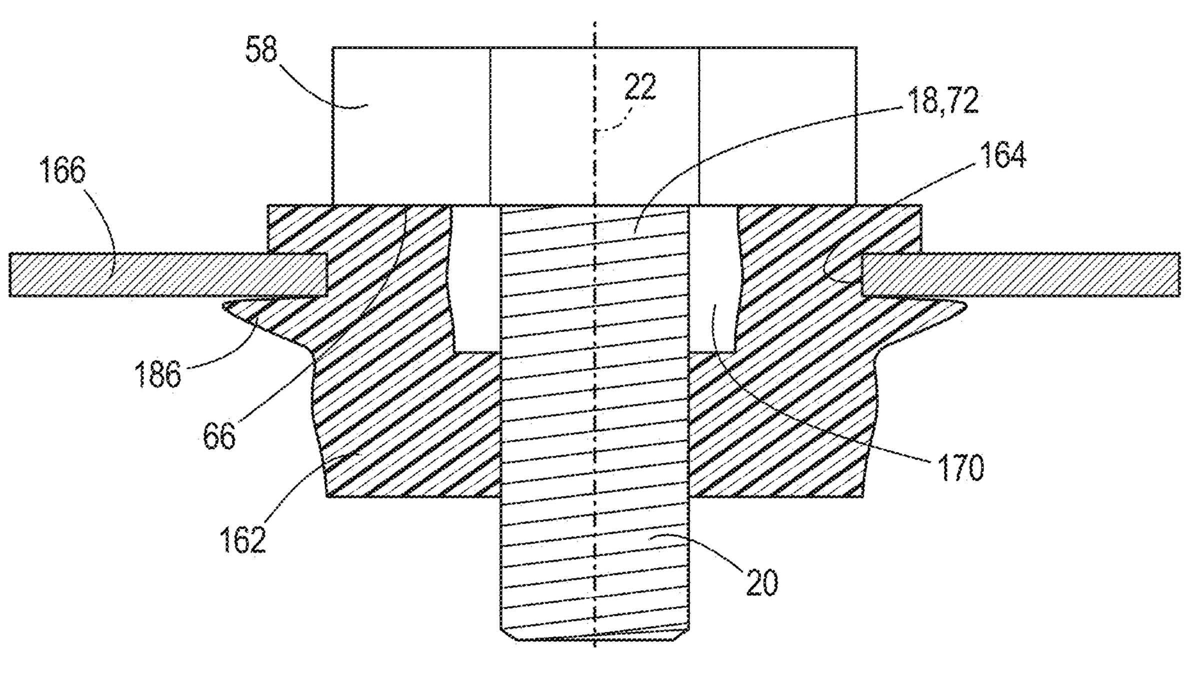
FIG. 9 is a cross-sectional view of the output shaft of the blind rivet nut-setting tool of FIG. 1 performing a setting stroke on the blind rivet nut.

As the lobe 94 is pulled away from the front piece 46, the carrier 86 translates along the longitudinal axis 22 from the first carrier position to a second carrier position, thereby pulling the output shaft 18 (via the flange 118) along the longitudinal axis 22 from the first output shaft position (or a position near the first output shaft position) to a third output shaft position corresponding to the second carrier position of the carrier 86. During the setting stroke, the output shaft 18 sets the blind rivet nut 162 by deforming a portion 186 of the blind rivet nut 162 against the workpiece 166, as shown in FIG. 9. In the described embodiment, the third output shaft position is different than the second output shaft position. However, in other embodiments, the third output shaft position may be the same as the second output shaft position.

As the carrier 86 moves from the first carrier position to the second carrier position, the actuating arm 121 is pivoted to the actuating position via its arrangement in the groove 123 of the carrier 86. However, during the setting stroke, actuation of the limit switch 122 does not result in the first motor 26 being activated. Rather, the first motor 26 is maintained in a deactivated state to avoid rotating the output shaft 18 during the setting stroke.

When the carrier 86 reaches the second carrier position during the setting stroke, the magnet 150 in the cam member 138 is detected by the sensor 154, causing the second motor 30 to reverse its rotational direction. Thus, the cam member 138 is rotated clockwise as viewed in FIG. 3 about the rotation axis 142, causing the pin 146 to move within the recess 98 of the lobe 94 and thereby pull the lobe 94 toward from the front piece 46. The carrier 86 is thus moved in a forward direction towards the first carrier position (FIG. 2).

Figure 10:
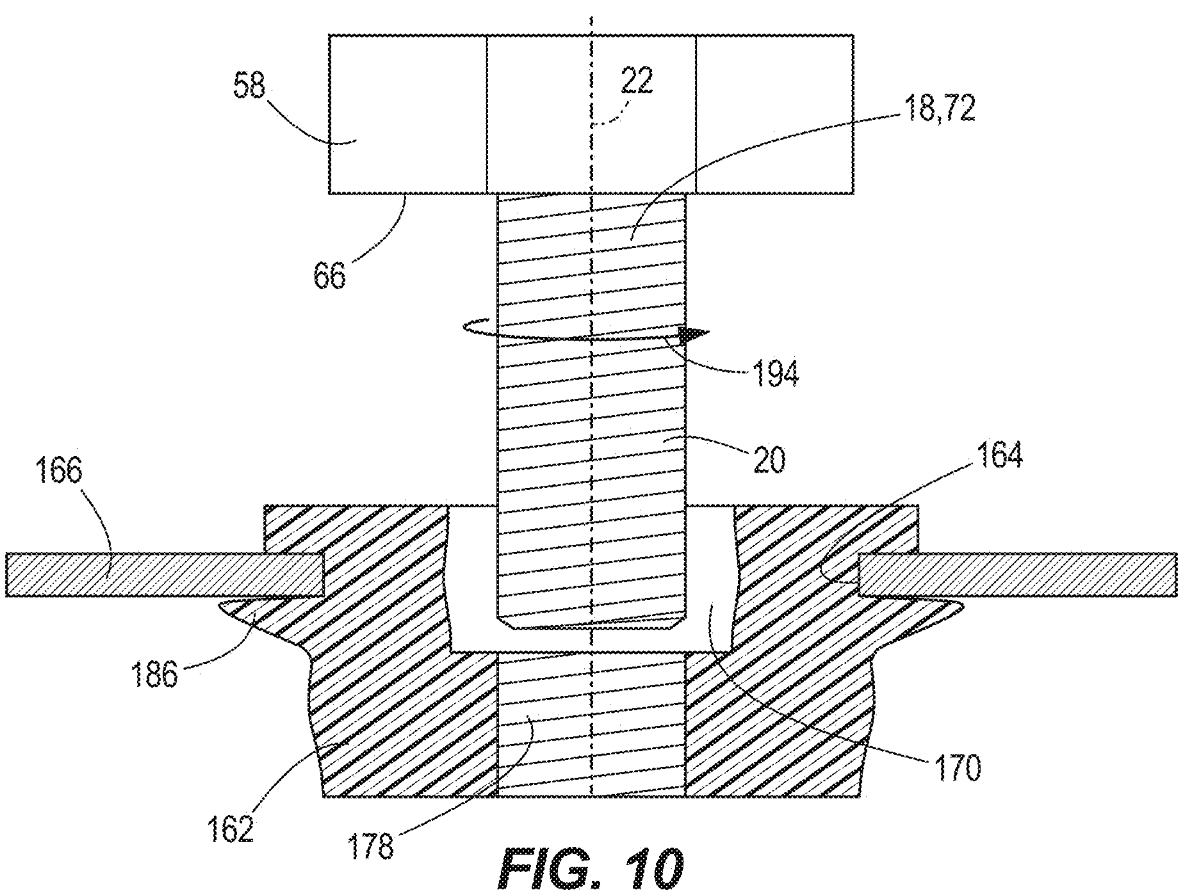
FIG. 10 is a cross-sectional view of the output shaft of the blind rivet nut-setting tool of FIG. 1 being unthreaded from the blind rivet nut.

Once the carrier 86 has returned to the first carrier position at which time the setting stroke has been completed, the operator may depress a reverse button 190 (FIG. 1) to activate the first motor 26 and rotate the output shaft 130 in an unthreading direction that is opposite the threading direction. The output shaft 18 is also rotated in a reverse direction, thus beginning an unthreading action from the blind rivet nut 162. Specifically, as shown in FIG. 10, the output shaft 18 is caused to rotate in an unthreading direction 194 that is opposite the threading direction 184, thus unthreading the output shaft 18 from the threaded bore 178 of the now-set blind rivet nut 162. As the output shaft 18 unthreads from the blind rivet nut 162, the output shaft 18 also translates along the longitudinal axis 22 to return to the first output shaft position where the tool 10 is ready for a subsequent setting operation.

Various features of the invention are set forth in the following claims.

What is claimed is:

1. A method of operating a blind rivet nut-setting tool, the method comprising:

pressing a blind rivet nut on an output shaft of the tool against a workpiece, thereby applying an external force to the output shaft to move the output shaft in a rearward direction along a longitudinal axis from a first position to a second position;

activating a first motor to rotate the output shaft about the longitudinal axis in response to the output shaft activating a limit switch after reaching the second position, thereby rotating the output shaft relative to the blind rivet nut causing plastic deformation of the blind rivet nut; and activating a second motor to translate the output shaft along the longitudinal axis in the rearward direction, causing further plastic deformation of the blind rivet nut and permanently setting the blind rivet nut on the workpiece, wherein the step of activating the second motor includes translating a carrier from a first carrier position to a second carrier position, and wherein the step of translating the carrier from the first carrier position to the second carrier position includes the second motor rotating a cam member coupled to the carrier about a rotational axis.

2. The method of claim 1, wherein in response to the limit switch being activated, the step of the first motor being caused to rotate the output shaft about the longitudinal axis is automatically performed.

3. The method of claim 1, wherein the cam member includes a pin arranged in a lobe of the carrier.

4. The method of claim 3, wherein the rotational axis is perpendicular to the longitudinal axis.

5. The method of claim 3, further comprising, in response to the carrier being translated from the first carrier position to the second carrier position, detecting a magnet on the cam member with a sensor.

6. The method of claim 5, further comprising, in response to detecting the magnet with the sensor, activating the second motor to rotate the cam member to translate the carrier from the second carrier position to the first carrier position.

7. The method of claim 1, further comprising:

depressing a trigger to activate the second motor, causing the second motor and a cam member to rotate about a rotational axis and displace the output shaft along the longitudinal axis to a third position where the blind rivet nut becomes plastically deformed and permanently set on the workpiece; and depressing a reverse trigger to activate the first motor and rotate the output shaft in an unthreading direction to unthread the blind rivet nut from the output shaft.

8. The method of claim 7, wherein the step of rotating the cam member includes causing a pin to move within a recess, which displaces a carrier from a first carrier position to a second carrier position.

9. The method of claim 8, further comprising, in response to the carrier being translated from the first carrier position to the second carrier position, detecting a magnet on the cam member with a sensor.

10. The method of claim 9, further comprising, in response to detecting the magnet with the sensor, activating the second motor to rotate the cam member to translate the carrier from the second carrier position to the first carrier position.

11. The method of claim 7, wherein the rotational axis is perpendicular to the longitudinal axis.

12. The method of claim 1, further comprising:

activating the first motor to rotate the output shaft about the longitudinal axis in response to the output shaft reaching the second position, thereby coupling the blind rivet nut onto the output shaft and translating the output shaft toward the first position;

deactivating the first motor in response to the output shaft returning to the first position, at which point the blind rivet nut is engaged with a nosepiece of the tool; and activating the second motor to translate the output shaft along the longitudinal axis toward a third position that is rearward of the first position, thereby crushing the blind rivet nut against the nosepiece.

13. The method of claim 12, further comprising activating the first motor to rotate the output shaft about the longitudinal axis to unthread the output shaft from the blind rivet nut after crushing the blind rivet nut against the nosepiece.

14. The method of claim 12, further comprising activating a limit switch in response to the step of applying the external force to the output shaft to move the output shaft in the rearward direction along the longitudinal axis from the first position to the second position, wherein in response to the limit switch being activated, the step of the first motor being caused to rotate the output shaft about the longitudinal axis is automatically performed.

15. The method of claim 12, wherein the step of activating the second motor to translate the output shaft along the longitudinal axis to the third position that is rearward of the first position includes translating a carrier from a first carrier position to a second carrier position.

16. The method of claim 15, wherein the step of translating the carrier from the first carrier position to the second carrier position includes the second motor rotating a cam member about a rotational axis with a pin arranged in a lobe of the carrier.

17. The method of claim 16, wherein the rotational axis is perpendicular to the longitudinal axis.

18. The method of claim 16, further comprising, in response to the carrier being translated from the first carrier position to the second carrier position, detecting a magnet on the cam member with a sensor.

19. The method of claim 18, further comprising, in response to detecting the magnet with the sensor, activating the second motor to rotate the cam member to translate the carrier from the second carrier position to the first carrier position.

20. A method of operating a blind rivet nut-setting tool, the method comprising:

pressing a blind rivet nut on an output shaft of the tool against a workpiece, thereby applying an external force to the output shaft to move the output shaft in a rearward direction along a longitudinal axis from a first position to a second position;

activating a first motor to rotate the output shaft about the longitudinal axis in response to the output shaft activating a limit switch after reaching the second position, thereby rotating the output shaft relative to the blind rivet nut causing plastic deformation of the blind rivet nut;

activating a second motor to translate the output shaft along the longitudinal axis in the rearward direction, causing further plastic deformation of the blind rivet nut and permanently setting the blind rivet nut on the workpiece;

depressing a trigger to activate the second motor, causing the second motor and a cam member to rotate about a rotational axis and displace the output shaft along the longitudinal axis to a third position where the blind rivet nut becomes plastically deformed and permanently set on the workpiece; and depressing a reverse trigger to activate the first motor and rotate the output shaft in an unthreading direction to unthread the blind rivet nut from the output shaft.

21. A method of operating a blind rivet nut-setting tool, the method comprising:

pressing a blind rivet nut on an output shaft of the tool against a workpiece, thereby applying an external force to the output shaft to move the output shaft in a rearward direction along a longitudinal axis from a first position to a second position;

activating a first motor to rotate the output shaft about the longitudinal axis in response to the output shaft activating a limit switch after reaching the second position, thereby rotating the output shaft relative to the blind rivet nut causing plastic deformation of the blind rivet nut;

activating a second motor to translate the output shaft along the longitudinal axis in the rearward direction, causing further plastic deformation of the blind rivet nut and permanently setting the blind rivet nut on the workpiece;

activating the first motor to rotate the output shaft about the longitudinal axis in response to the output shaft reaching the second position, thereby coupling the blind rivet nut onto the output shaft and translating the output shaft toward the first position;

deactivating the first motor in response to the output shaft returning to the first position, at which point the blind rivet nut is engaged with a nosepiece of the tool; and activating the second motor to translate the output shaft along the longitudinal axis toward a third position that is rearward of the first position, thereby crushing the blind rivet nut against the nosepiece.

* * * * *